2 Sheets—Sheet 1.
M. VERGNES.
ELECTROGALVANIC MACHINE FOR PRODUCING MOTION BY GALVANIC ELECTRICITY.
No. 14,682. Patented Apr. 15, 1856.
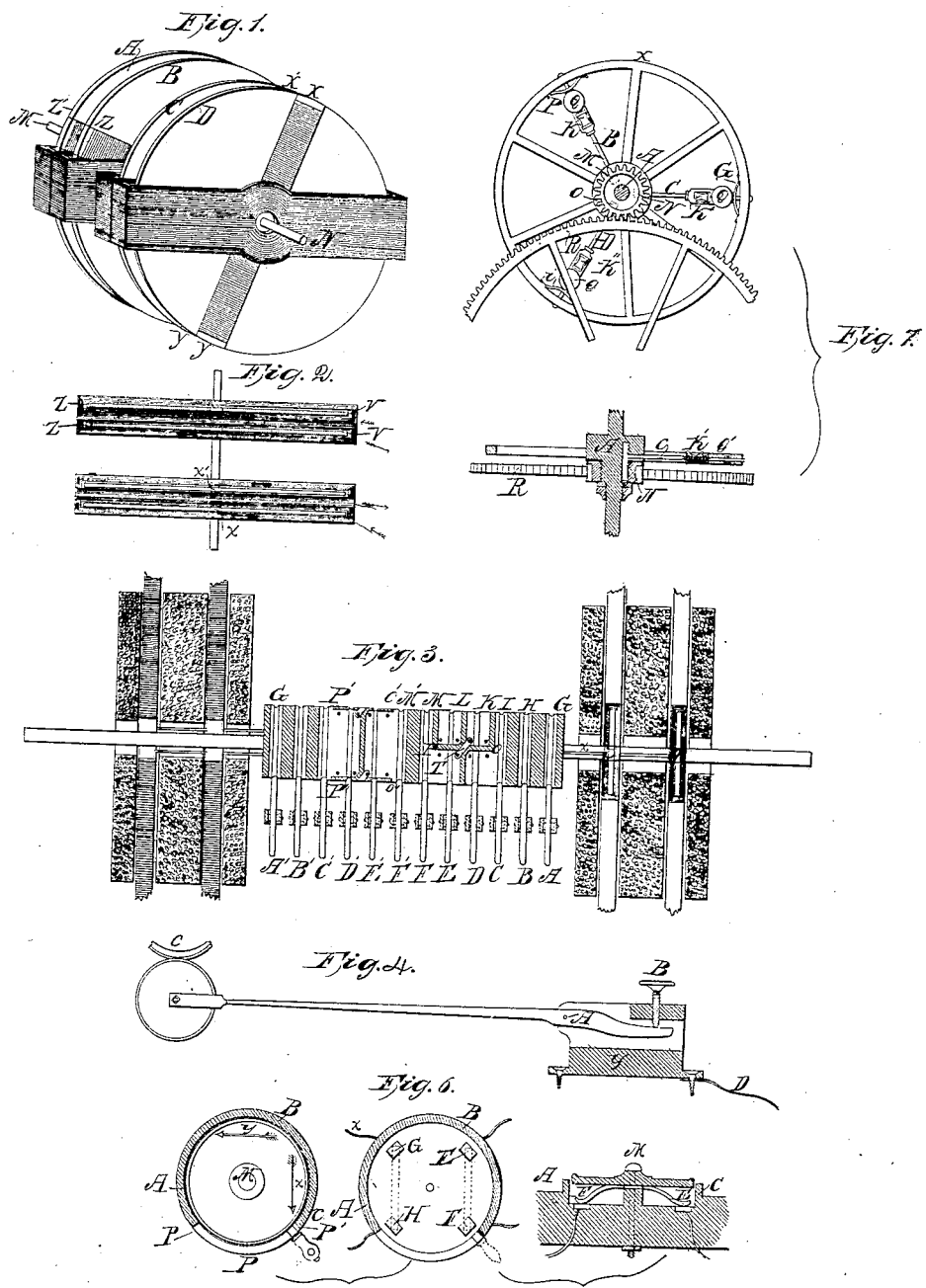

M. VERGNES.
ELECTROGALVANIC MACHINE FOR PRODUCING MOTION BY GALVANIC ELECTRICITY.

No. 14,682.          Patented Apr. 15, 1856.

UNITED STATES PATENT OFFICE.

MAURICE VERGNES, OF NEW YORK, N. Y.

IMPROVEMENT IN ELECTRO-MAGNETIC ENGINES.

Specification forming part of Letters Patent No. 14,682, dated April 15, 1856.

*To all whom it may concern:*

Be it known that I, MAURICE VERGNES, of the city, county, and State of New York, have invented a new and useful Improvement in Electro-Galvanic Machines for Producing Motion by Galvanic Electricity, of which the following is a description, reference being had to the annexed drawings, making a part of this specification.

A B C D, Figure 1, are four wheels, composed of wood or any other suitable material, revolving upon a common axle, M N, and each including an electro-magnet forming their diameters, respectively, X Y X′ Y′ Z V Z′ V′, Figs. 1 and 2, and so arranged that in each pair in either wheel the magnets are parallel, but with contrary adjacent poles. Each pair of the magnets communicates with a separate galvanic battery, and whatever be the position of the wheels the polarization of the magnets remains unaltered and continuous, as will be explained hereinafter. Each pair of magnets revolves in a peculiarly-arranged multiplying coil, the coils being side by side and parallel to each other. The two multiplying-coils communicate with separate galvanic batteries, thus, with the separate batteries requisite for the magnets, requiring in all four distinct batteries equal in intensity. By means of pole-changers the direction of the electric current is reversed in the multiplying-coils at every half-revolution of the wheels and in each pair at the moment when the other pair is exerting its greatest force, the force, of course, varying according to the position of the magnets in relation to the coils. The conductive power of the multiplying-coil should be as nearly as possible equal to the conductive power of the helix of the electro-magnet revolving therein.

Fig. 2 is a plan of the machine, the arrows designating the direction of the wires and the electric currents. The currents in the two multiplying-coils are reversed alternately, so as to produce a continuous revolution to the wheels without any change in the polarization of the magnets, which have additional energy from the approximation of their opposite poles.

Fig. 3 represents a vertical section taken transversely through the wheels and coils, and exhibiting in longitudinal view the electric communicator or pole-changing device. The latter rests upon a number of rollers, A B C D E F F′ E′ D′ C′ B′ A′. The part of the communicator included between G and M transmits the electricity to the right side of the machine, as delineated, and the part between G′ and M′ connects with the left side and is similar to the part G M, which will alone be described. G H I M are perfect metallic bands or rings isolated by ivory or other substance. K and L are half-rings fastened to the cylinder by screws, and also isolated. S and N represent the north and south poles of the magnets, viewed at right angles to the plane of representation of Fig. 3. The insulating-separator P O, which is exactly repeated upon the opposite side of the communicator, must be in line with the north and south poles of its respective magnet. The half-ring K communicates with the ring M by a little metallic band, delineated by T, and the half-ring L communicates in a similar manner with ring I. The ring G connects with one end of the magnet wire $x$, of the magnets of which S N represent the north and south poles; the ring H with the other end. The two rollers A and B communicate the positive and negative electricity of one of the galvanic batteries, exciting the helix of one pair of the magnets, and thus while the wheels with their magnets revolve the electricity of the magnets is unchanged. The rollers C and F communicate the electricity of the second battery for exciting the multiplying coils. The rollers E and D connect with the respective ends of the multiplying-coils; hence by means of the ivory P O, and the arrangement of the bands and demi-bands, the electricity of the multiplier is changed at every demi-revolution of the wheels. The other half of the communicator is in effect similar, P O being represented by P′ O′ and P″ O″; but as the other pair of magnets are at right angles to the magnets of which S N represent the north and south poles, a corresponding change must be made in the disposition of the rings and demi-rings, as shown by the drawings, and hence the reversing of the current is effected in each coil when it is at its minimum intensity and the other at its maximum, as governed by the position of the magnets in relation to the coils. The electricity might be communicated by a simpler arrangement, but I prefer this because the rollers diminish the friction. I do not restrict myself to this arrangement or the number of the rollers, but I may use more or less or reverse the electricity of the magnets instead of that of the coils.

Fig. 4 represents a roller with its support, the shaft being movable at A, and by means of screw B, capable of being approached at will, to the communicator, which appears at C. The copper wire D, soldered at the support $y$, conducts the electricity, and is concealed in the body of the machine.

Figure 5:
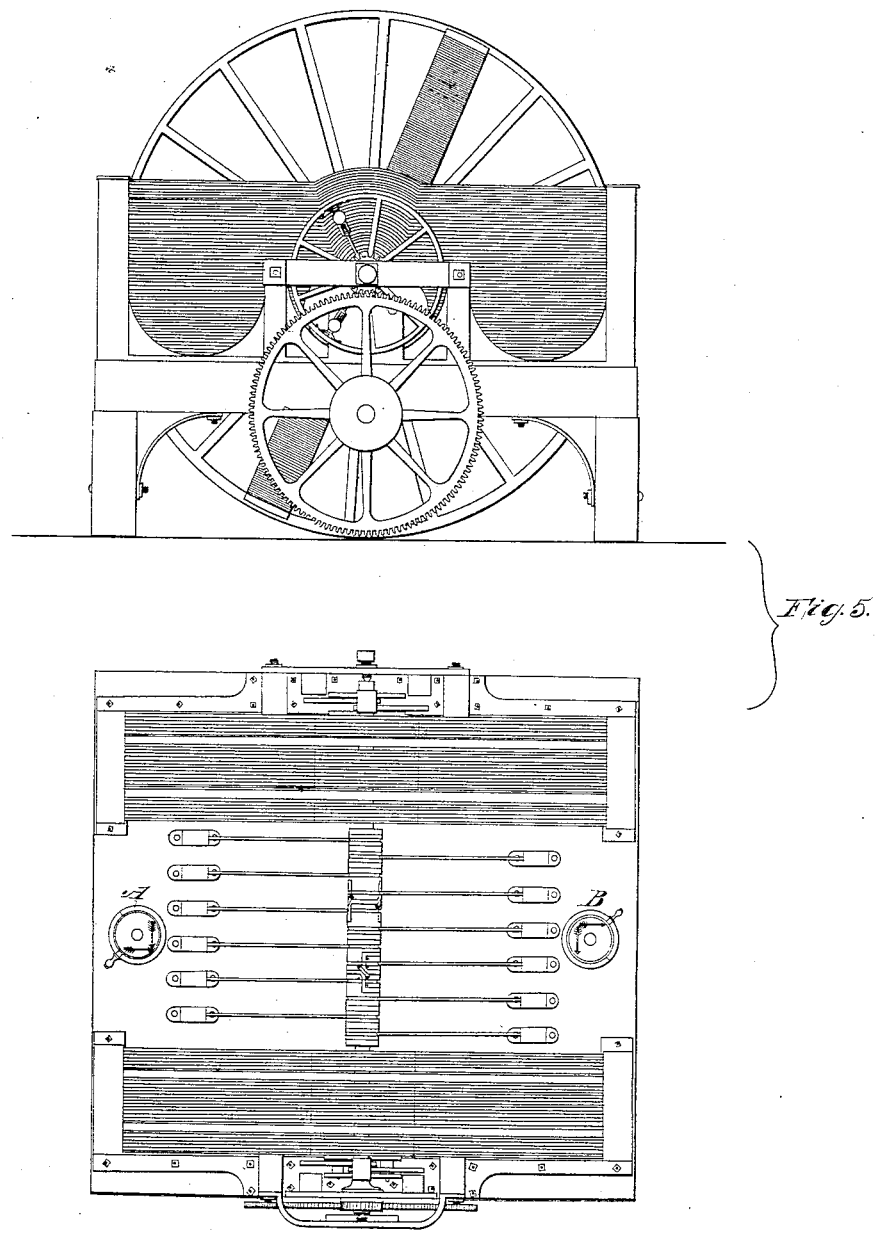
Fig. 5 shows the plan and elevation of the machine complete.

Fig. 6, delineated in the plan of the machine by A and B, is a pole-changer for reversing the electricity of the magnets to reverse the motion of the machine. The arrows X and Y, engraved on a movable plate, indicate the direction of the current. The plate moved by the handle O, so that the arrows take the position P P′ P″, turns upon the fixed pivot M within the inclosure A B C. When the handle is at P″ the arrow Y indicates the direction of the current of the magnet. At P′ it is reversed, and indicated by X, and at P it is altogether interrupted. The movable plate has attached to the lower side two bars of steel, E F G H, which, in the positions P′ or P″, connect F with E and G with H or F with H and G with E. Therefore, if F and G communicate with the two poles of the battery and E and H with the two ends of the magnet-wire, the electricity of the magnet can be reversed at pleasure and when the handle is at P suspended; or any other form of pole-changer for reversing the electricity of the magnets to change the run of the machine may be used.

By Fig. 7 is represented a mechanical device for developing the power of the machine when the latter has acquired the requisite velocity. The axle of the machine, of which a section is shown by A, has three grooves or slots, M N O, and in these grooves are loosely fitted three rods of steel firmly attached to the spokes B C D of the wheel X, which is secured upon the axle. The spokes B C D move freely through the rim of the wheel and are kept in their place by the springs F G I, which can be approached to the rim by the screws K K′ K″, the latter pressing the balls Q Q′ Q″, which slide upon the spokes. Thus the rotary velocity of the wheel increasing presses the rods M N O against the pinion, and by this means communicates motion to the cog-wheel R.

What I claim and wish to secure by Letters Patent is—

The concurrent action of two or more electro-magnets, parallel and with contrary adjacent poles, revolving upon an axle common to both, within a double multiplying-coil, arranged or running between and on the outside of the magnets in opposite directions, and acting upon both sides or faces of the magnets, as described.

M. VERGNES.

Witnesses:
R. M. BENEDICT,
TH. DE FORMANER.